(12) United States Patent
Yanagi et al.

(10) Patent No.: US 6,916,101 B2
(45) Date of Patent: Jul. 12, 2005

(54) METALLIC MIRROR, METALLIC ROTARY POLYGONAL MIRROR, AND PROCESS FOR THEIR PRODUCTION

(75) Inventors: Michio Yanagi, Chichibu (JP); Satoshi Takaoka, Tsurugashima (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/742,415

(22) Filed: Dec. 22, 2000

(65) Prior Publication Data

US 2001/0024323 A1 Sep. 27, 2001

(30) Foreign Application Priority Data

Dec. 24, 1999 (JP) ............................................. 11-368036
Jan. 28, 2000 (JP) ........................................ 2000-020269

(51) Int. Cl.$^7$ ............................. G02B 7/182; G02B 5/09
(52) U.S. Cl. ....................... 359/883; 359/884; 359/855; 359/584; 359/216
(58) Field of Search ................................. 359/216, 584, 359/855, 871, 872, 883, 884

(56) References Cited

U.S. PATENT DOCUMENTS

| | | | | |
|---|---|---|---|---|
| 3,945,899 A | * | 3/1976 | Nikaido et al. | |
| 4,101,365 A | * | 7/1978 | Fisli | |
| 4,205,100 A | * | 5/1980 | Fisli | |
| 4,322,130 A | * | 3/1982 | Ito et al. | |
| 4,482,209 A | * | 11/1984 | Grewal et al. | |
| 4,490,184 A | * | 12/1984 | Forcht et al. | |
| 4,592,622 A | * | 6/1986 | Hashimoto et al. | |
| 4,643,518 A |  | 2/1987 | Taniguchi | ................... 350/6.8 |
| 4,826,271 A | * | 5/1989 | Takahashi et al. | |
| 5,004,308 A | * | 4/1991 | Hall et al. | |
| 5,019,458 A | * | 5/1991 | Elgat et al. | |
| 5,216,551 A | * | 6/1993 | Fujii | |
| 5,583,704 A | * | 12/1996 | Fujii | |
| 5,946,125 A | * | 8/1999 | Ang | |

FOREIGN PATENT DOCUMENTS

| | | | |
|---|---|---|---|
| EP | 0 093 921 A1 | | 11/1983 |
| JP | 57-4003 | * | 1/1982 |
| JP | 58-184903 | | 10/1983 |
| JP | 60-195502 | | 10/1985 |
| JP | 62-26768 | * | 2/1986 |
| JP | 62-238504 | * | 10/1987 |
| JP | 02-109003 | * | 4/1990 |
| JP | 4-264513 | * | 9/1992 |
| JP | 5-281405 | * | 10/1993 |
| JP | 6-208076 | | 7/1994 |

* cited by examiner

Primary Examiner—Ricky D. Shafer
(74) Attorney, Agent, or Firm—Fitzpatrick, Cella, Harper & Scinto

(57) ABSTRACT

A metallic mirror comprising a substrate made of aluminum or an aluminum alloy, and superposingly provided thereon, in order, an intermediate $TiO_2$ layer and a metallic reflective in layer. The metallic mirror may be a metallic mirror which further comprises a protective layer including at least an $Al_2O_3$ layer formed by vacuum deposition on the metallic reflective layer. Also disclosed is a process for producing a metallic mirror, comprising the steps of forming the intermediate layer by vacuum deposition on a metallic polygonal mirror substrate metal, forming the metallic reflective Cu layer by vacuum deposition on the intermediate layer, and forming the protective layer by vacuum deposition on the metallic reflective layer.

1 Claim, 9 Drawing Sheets

PHOTOGRAPH 1

MICROPHOTOGRAPH (×100)

PHOTOGRAPH 2

MICROPHOTOGRAPH (×100)

PHOTOGRAPH 3

FIB PHOTOGRAPH OF CORROSION PART

PHOTOGRAPH 4

FIB PHOTOGRAPH OF FILM LIFTING PHENOMENON

PHOTOGRAPH 5

SAMPLE ×200

PHOTOGRAPH 6

UNUSUAL PART  ×500

PHOTOGRAPH 7

UNUSUAL PART  ×1000

SEM PHOTOGRAPH OF Cr FILM SURFACE ×100K

SEM PHOTOGRAPH OF TiO₂ FILM SURFACE ×100K

METALLIC MIRROR, METALLIC ROTARY POLYGONAL MIRROR, AND PROCESS FOR THEIR PRODUCTION

BACKGROUND OF THE INVENTION

1. Field of the Invention

This invention relates to a metallic mirror and a metallic rotary polygonal mirror which are usable as reflecting mirrors in copying machines, facsimile machines, laser beam printers or the like and as mirrors for microchip optical scanners, and also relates to a process for their production. More particularly, this invention relates to a metallic mirror and a metallic rotary polygonal mirror which have a superior environmental stability and a stability in reflectance, having a high reflectance, and a process for their production.

2. Related Background Art

Conventionally available metallic rotary polygonal mirrors include, e.g., the following (1), (2) and (3).

(1) A metallic mirror whose rotary polygonal mirror substrate made of aluminum or an aluminum alloy has been anodized on its cut mirror surface to form a transparent film (anodic oxide film) to provide a mirror-surface protective film (Japanese Patent Application Laid-Open No. 58-184903).

(2) A metallic mirror whose rotary polygonal mirror substrate made of aluminum or an aluminum alloy is provided with a metallic thin film of Cr formed by vacuum deposition and further provided thereon with a high-reflectance metallic thin film of Cu formed by vacuum deposition (Japanese Patent Application Laid-Open No. 60-195502).

(3) A metallic mirror whose rotary polygonal mirror substrate made of aluminum or an aluminum alloy is provided with an intermediate layer, a metallic reflective layer and a protective film which are formed by vacuum deposition in order; the intermediate layer being a Cr layer having a layer thickness of from 50 nm to 100 nm, the metallic reflective layer a Cu layer having a layer thickness of from 100 nm to 150 nm, and the protective film an $Al_2O_3$ layer having a layer thickness of from 150 nm to 200 nm (Japanese Patent Application Laid-Open No. 6-208076).

Of the above conventional metallic mirrors, the mirror (1) has an average reflectance of about 85%, which cannot be said to be a sufficient reflectance for the achievement of higher speed in copying machines and laser beam printers. Also, when the anodic oxide film is formed on the substrate made of aluminum or an aluminum alloy, the presence of any impurities such as Si on the rotary polygonal mirror substrate may possibly cause pit-like defects in the anodic oxide film. Accordingly, the aluminum or aluminum alloy must be those having a high purity, and hence expensive materials are required for the rotary polygonal mirror substrate, resulting in a high cost.

As for the mirrors (2) and (3), they have a high reflectance, but have an environmental stability problem. When these metallic rotary polygonal mirrors are placed in a high-temperature and high-humidity environment (e.g., 45° C., 95% RH, 100 hrs, $O_3$ 1 ppm; or 70° C., 85% RH, 100 hrs, $O_3$ 1 ppm), the following phenomena may take place.

i) As shown diagrammatically in FIG. 3, a dissolution reaction of a metal and a reduction reaction of an oxygen take place, which are considered due to the formation of local cells. What makes this reaction take place is the water-absorptive dust adhered to the film surface, where $H_2O$ locally enters the film. Oxygen dissolved in the water is further involved, and the water passes from the outermost layer through $SiO_2 \rightarrow Al_2O_3 \rightarrow Cu \rightarrow Cr$ to reach the underlying substrate Al. As the result, an aluminum oxide is formed such as $Al_2O_3$, which causes volume expansion to increase film lift, resulting in defects. This phenomenon can be explained by oxidation reduction reaction as shown by the following scheme.

Anode: $Al \rightarrow Al^{3+} + 3e_-$ (dissolution reaction of Al)

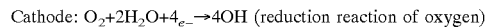
Cathode: $O_2 + 2H_2O + 4e_- \rightarrow 4OH$ (reduction reaction of oxygen)

Optical-microscope photographs and a cross-sectional photograph [analysis by FIB (focused ion beam)] of such a corrosion phenomenon are shown in FIGS. 6 and 7 and FIG. 8, respectively.

More specifically, the present inventors placed in the high-temperature and high-humidity environment (45° C., 95% RH, 100 hrs, $O_3$ 1 ppm; or 70° C., 85% RH, 100 hrs, $O_3$ 1 ppm) a metallic rotary polygonal mirror comprised of an aluminum substrate, and a Cr layer as an intermediate layer, a Cu layer as a reflective layer and an $Al_2O_3$ layer (dielectric layer) and an $SiO_2$ layer as protective layers superposed on the aluminum substrate, and observed it. As a result, as shown in FIGS. 6 and 7 (both optical-microscope photographs at corroded portions) and FIG. 8 (an FIB cross-sectional photograph), corrosion was found to have occurred.

ii) A phenomenon of "film lifting" may occur as shown in a photograph 4 given as FIG. 9 and photographs 6 to 8 given as FIGS. 10 to 12. As can be seen from these cross-sectional photographs, films are separated at the interface between the intermediate layer Cr film and the reflective layer Cu film.

Measurements of each film stress between the intermediate layer Cr, the reflective layer Cu and the dielectric layer $Al_2O_3$ reveal that the Cr film has a stress of $+4.15 \times 10^8$ Pa, the Cu film $+1.53 \times 10^8$ Pa, and the $Al_2O_3$ film $-0.63 \times 10^8$ Pa, showing great differences in stress among them, which can be presumed to be caused by the separation between the Cr film and the Cu film.

SUMMARY OF THE INVENTION

Accordingly, an object of the present invention, which was made taking into account the problems the conventional techniques have had, is to provide a metallic mirror and a metallic rotary polygonal mirror to achieve a superior environmental resistance and a high reflectance, and a process for producing them.

Another object of the present invention is to provide a metallic mirror and a metallic rotary polygonal mirror which do not cause any phenomenon of film lifting, and a process for producing them.

The present invention provides a metallic mirror comprising a substrate made of aluminum or an aluminum alloy, and an intermediate layer of $TiO_2$ and a metallic reflective layer of Cu superposed on the substrate.

The present invention also provides a metallic mirror comprising a metallic polygonal mirror substrate made of aluminum or an aluminum alloy, an intermediate layer of $TiO_2$ formed by vacuum deposition on the substrate, a metallic reflective layer of Cu formed by vacuum deposition on the intermediate layer, and a protective layer which includes at least a layer of $Al_2O_3$ and is formed by vacuum deposition on the metallic reflective layer.

The present invention also provides a process for producing a metallic mirror, comprising the steps of:

forming an intermediate layer of $TiO_2$ by vacuum deposition on a metallic polygonal mirror substrate comprised of aluminum or an aluminum alloy;

forming a high-reflectance metallic reflective layer of Cu by vacuum deposition on the intermediate layer; and forming a protective layer including at least a layer of $Al_2O_3$, by vacuum deposition on the metallic reflective layer.

It is considered that a good environmental stability attributable to the metallic mirror of the present invention can be explained in the following way.

A thin $TiO_2$ film formed as an intermediate layer between the mirror surface of rotary polygonal mirror substrate made of aluminum or an aluminum alloy and the metallic reflective layer Cu film can prevent $H_2O$ and $O_2$ from entering through the film's outermost layer in a high-humidity environment. As the result, the aluminum or aluminum alloy substrate can be kept from being oxidized into $Al_2O_3$ which brings about volume expansion to raise the film, so that corrosion damage is inhibited from occurring.

It is also considered that the advantage brought about by the metallic mirror of the present invention which do not cause any phenomenon of film lifting can be explained in the following way.

The stress of the various thin films of Cr (stress: $+4.15 \times 10^8$ Pa), Cu (stress: $+1.53 \times 10^8$ Pa) and $Al_2O_3$ (stress: $-0.63 \times 10^8$ Pa) has been greatly different between Cr and Cu films, whereas, in place of these, the thin films in the present invention are constituted of $TiO_2$ (stress: $+0.30 \times 10^8$ Pa), Cu and $Al_2O_3$, so that the difference in stress between the thin films can be minimized, and the phenomenon of "film lifting" can be prevented from occurring between the Cr and Cu films.

Here, the stress is measured by the Stoney's method in which stress is determined from warpage of each film formed as a single film on a glass substrate, and is calculated from the following equation.

$$\text{Tress } \sigma = EsD^2/[6(1-\upsilon)R]$$

wherein:

Es: Young's modulus of the substrate;

D: thickness of the substrate;

$\upsilon$: Poisson's ratio of the substrate; and

R: curvature of radius of warpage;

and plus sign (+) indicates tensile direction, and minus sign (−) compression direction.

DESCRIPTION OF THE PREFERRED EMBODIMENTS

Figure 1:
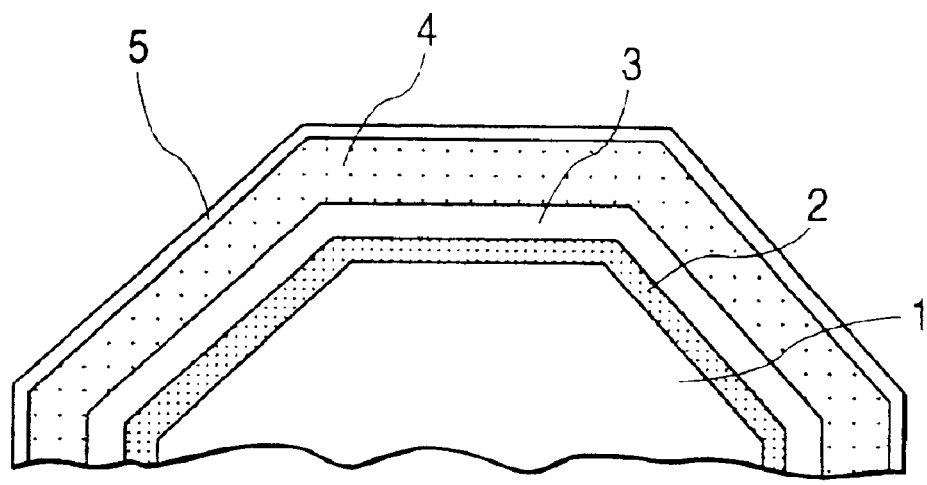
FIG. 1 is a partial (about half) diagrammatic cross-sectional illustration of metallic rotary polygonal mirrors of Examples 1 and 2 according to the present invention.

The metallic mirror of the present invention is usable as various types of mirrors such as a bathroom mirror, an automobile rearview mirror, a lamp reflecting mirror and a dentist's mirror. FIG. 1 shows an example in which the metallic mirror according to the present invention is used as a rotary polygonal mirror.

As shown in FIG. 1, on the periphery of a rotary polygonal mirror substrate 1 made of aluminum or an aluminum alloy, a mirror surface is formed by cutting or the like. Here is shown an example of an octahedral metallic rotary polygonal mirror, which, however, may have a polygonal shape other than octahedral.

Such a mirror has an insufficient reflectance of about 86% in itself, and also the substrate can not be said to have a sufficient corrosion resistance. Accordingly, in the present invention, an intermediate layer formed of $TiO_2$ and a metallic reflective layer 3 formed of Cu are provided on this metallic polygonal mirror substrate 1. The Cu metallic reflective layer 3 has a higher reflectance than the substrate metal (i.e., aluminum or an aluminum alloy). This can increase the reflectance required for a metallic rotary polygonal mirror. In the present invention, the $TiO_2$ intermediate layer 2 is provided so that the mirror surface of the substrate metal can be prevented from corrosion and the adhesion between the substrate and the high-reflectance metallic reflective layer can be improved.

In the present invention, the intermediate layer formed of $TiO_2$ may usually have a thickness from 20 nm to 200 nm, preferably from 50 nm to 150 nm, and most preferably from 50 nm to 100 nm, because a very thin layer may have insufficient durability and a very thick layer takes a long time to form, resulting in poor productivity. In the present invention, the layer thickness refers to a mechanical layer thickness unless otherwise specified.

The metallic reflective layer formed of Cu may also usually have a thickness of 80 nm or larger, preferably from 80 nm to 150 nm, and most preferably from 80 nm to 100 nm, because a very thin layer may have insufficient reflectance and a very thick layer takes a long time to form, resulting in poor productivity.

The TiO$_2$ intermediate layer and Cu metallic reflective layer may preferably be formed by, but not particularly limited to, deposition. This deposition includes vacuum deposition (in a narrow sense), sputtering and ion plating. With regard to the Cu film, it may be formed by a wet process such as plating, but in usual cases the deposition is preferred.

In the present invention, for the purpose of protecting the mirror surface and further for the purpose of also enhancing reflection, a protective layer which is comprised of one or more layers may preferably be provided on the surface of the metallic reflective layer. This protective layer is usually formed of a transparent dielectric material. In order to improve the function of protection or in order to enhance reflection more effectively, the protective layer may contain multiple layers. In particular, it is preferred that a protective layer is alternately formed of, from the metallic reflective layer side, a dielectric material having a low refractive index and a dielectric material having a high refractive index, because high reflectance can be easily achieved.

The dielectric material having a low refractive index may include MgF$_2$, SiO$_2$ and Al$_2$O$_3$. As the dielectric material having a high refractive index, ZrO$_2$, TiO$_2$, CeO$_2$ and SiO are preferred. Also, in this case, each protective layer may preferably have a layer thickness which is optimized so as to maximize a reflectance at the desired wavelength and minimize dependence upon an angle of incident light.

The intermediate layer TiO$_2$ film is indispensable in order to improve the adhesion between the substrate metal and the high-reflectance metallic reflective layer thin film. This is the most important item in the present invention.

Figure 2:
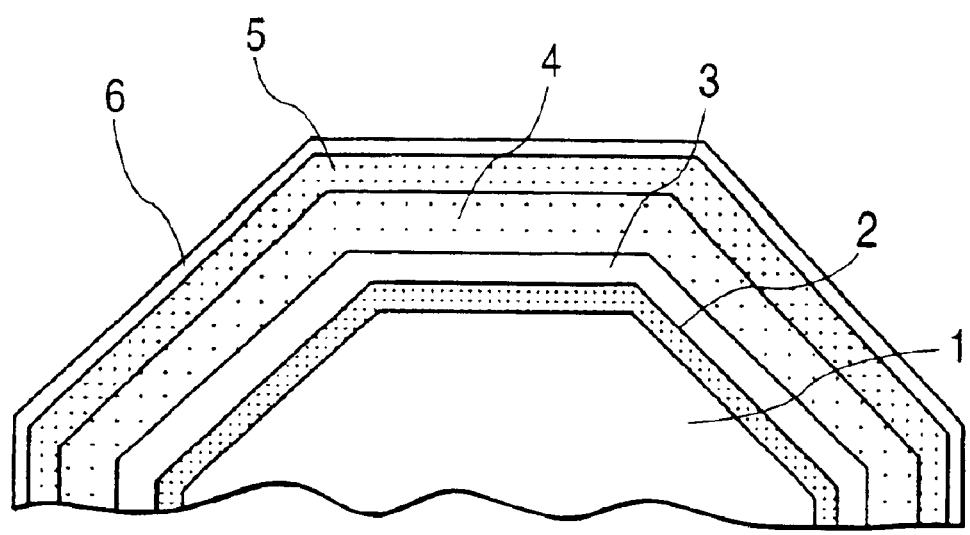
FIG. 2 is a partial (about half) diagrammatic cross-sectional illustration of metallic rotary polygonal mirrors of Examples 3 and 4 according to the present invention.
Figure 3:
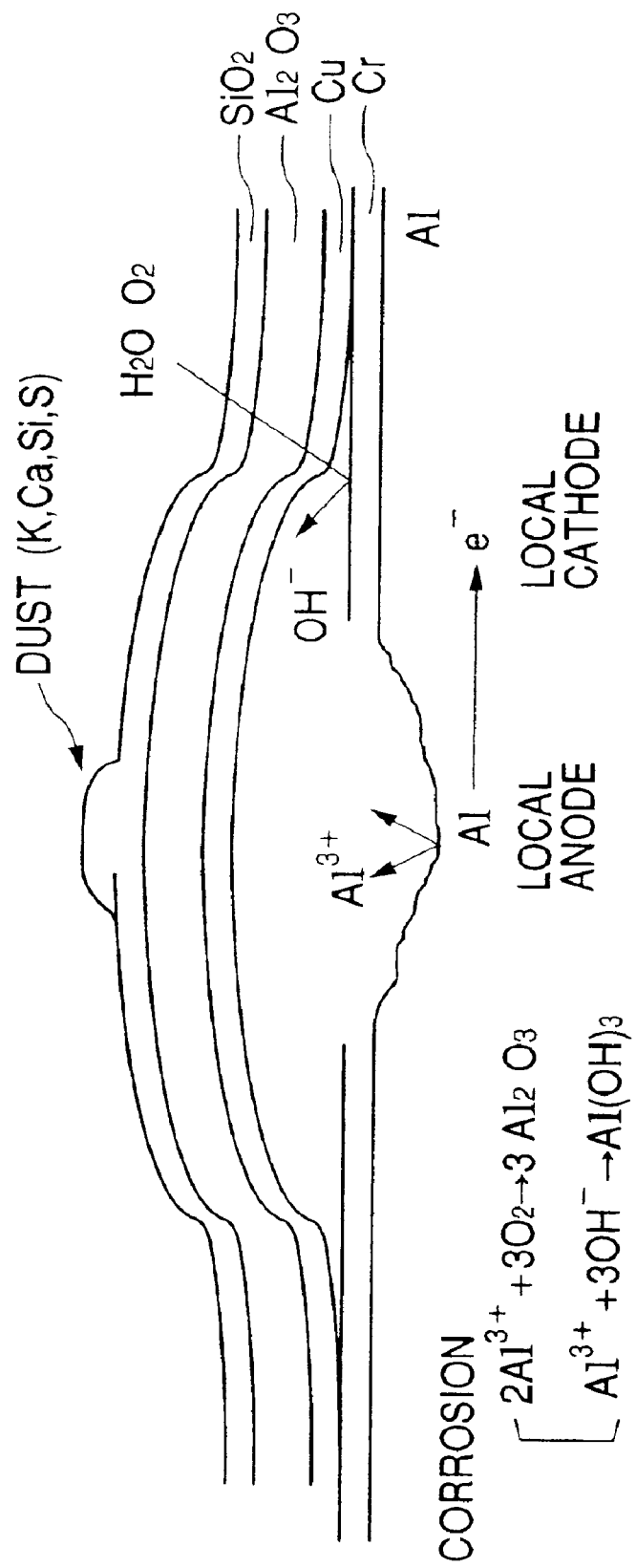
FIG. 3 is a diagrammatic illustration of a phenomenon of corrosion.

The present invention will be described below by specific Examples. FIG. 1 is a partial (about half) diagrammatic cross-sectional illustration of metallic rotary polygonal mirrors of Examples 1 and 2 according to the present invention. FIG. 2 is a partial (about half) diagrammatic cross-sectional illustration of metallic rotary polygonal mirrors of Examples 3 and 4 according to the present invention.

EXAMPLE 1

As shown in FIG. 1, on the metallic polygonal mirror substrate 1 made of an aluminum alloy (Al—Mg type), the intermediate layer 2, the metallic reflective layer 3, a protective layer (first protective layer) 4 and a protective layer (second protective layer) 5 were formed in order.

The intermediate layer 2 is a TiO$_2$ film, which may have a layer thickness from 50 nm to 150 nm. If its thickness is less than 50 nm, durability is insufficient. If its thickness is greater than 150 nm, deposition takes a long time, resulting in poor productivity.

When the intermediate layer comprised of this TiO$_2$ film is formed by vacuum deposition, the film may preferably be formed adding an O$_2$ gas under a pressure from $6.65 \times 10^{-3}$ Pa to $26.6 \times 10^{-3}$ Pa ($5 \times 10^{-5}$ Torr to $2 \times 10^{-4}$ Torr) as total pressure in the reaction space. If the O$_2$ gas pressure is lower than $6.65 \times 10^{-3}$ Pa, it is considered that the underlying aluminum alloy has a poor affinity for the TiO$_2$ film, so that film separation tends to occur between the TiO$_2$ film and the Cu film. If, on the other hand, the pressure is higher than $26.6 \times 10^{-3}$ Pa, it is considered that the Cu film tends to be oxidized, so that the mirror may have a reflectance lower than the desired 95%. Accordingly, the O$_2$ added in order to prevent film separation while ensuring the desired reflectance of 95% or higher may be at the pressure from 6.65 to $26.6 \times 10^{-3}$ Pa.

The metallic reflective layer 3 is a Cu film, which may have a layer thickness from 80 nm to 150 nm. If the Cu film has a layer thickness less than 80 nm, a low reflectance may result. If its thickness is greater than 150, deposition takes a long time, resulting in poor productivity. The metallic reflective layer 3 is formed using a W (tungsten) boat resistance heating system as an evaporation material heating system.

When the high-reflectance metallic thin film of Cu is formed by vacuum deposition on the intermediate layer of TiO$_2$ film, it may preferably be formed after the inside of a vacuum deposition chamber reaches a degree of vacuum of $2.66 \times 10^{-3}$ ($2 \times 10^{-5}$ Torr) Pa or above subsequently to the formation of the intermediate layer of TiO$_2$ film. If the inside of a vacuum deposition chamber has a degree of vacuum lower than $2.66 \times 10^{-3}$ Pa, the mirror may have a reflectance lower than the desired 95%. On the other hand, a reflectance of the desired 95% or higher can be ensured when the Cu film is formed by vacuum deposition after the pressure has reached $2.66 \times 10^{-3}$ Pa or above. This is presumed as follows. Any excess gas components remaining in the vacuum deposition chamber can be reduced when the chamber is brought into a high vacuum state before the deposition of Cu film, so that any residual gas can be prevented from entering the Cu film (to cause its oxidation). Hence, a high quality Cu film can be formed and the high reflectance can be achieved.

The protective layer (first protective layer) 4 is comprised of an Al$_2$O$_3$ film, and may have a layer thickness from 150 nm to 200 nm. If the Al$_2$O$_3$ film has a layer thickness less than 150 nm, durability may be insufficient. If it has a layer thickness is greater than 200 nm, the mirror may have insufficient optical characteristics such as reflecting properties inclusive of incident-angle dependence.

When the protective layer of Al$_2$O$_3$ is formed by vacuum deposition on the high-reflectance Cu metallic thin film, the protective layer or film may preferably be formed by vacuum deposition as follows:

i) without addition of any O$_2$ gas at the initial stage of film formation until the film reaches a layer thickness of 15 to 30% of the stated layer thickness, in order to improve the affinity of the Al$_2$O$_3$ protective film for the Cu film, in other words, the former's adhesion to the latter, and ii) further thereon, after the film has been formed beyond 15 to 30% and until it achieves the stated layer thickness, with addition of O$_2$ gas so that almost all the film has an Al:O ratio of 2:3, i.e., the Al$_2$O$_3$ film sufficiently combined with oxygen.

Even when the film is formed by vacuum deposition with the addition of O$_2$ gas from the beginning to the end of film formation, there is no problem in either reflectance or adhesion. Reflectance can be increased by about 0.3 to 0.5% when, as described above, the film is formed by vacuum deposition without adding any O$_2$ gas at the initial stage of film formation until the film achieves a layer thickness of 15 to 30% of the stated layer thickness and further thereon with the addition of O$_2$ gas after the film has been formed beyond 15 to 30% and until it achieves the stated layer thickness.

This is presumed as follows. Where the O$_2$ gas is fed into the vacuum deposition chamber in order to form the protective Al$_2$O$_3$ layer after the high-reflectance Cu metallic thin film has been formed, the surface layer portion of the Cu film may undergo oxidation to result in a somewhat low reflectance although the desired reflectance of 95% can be ensured, whereas the addition of no O$_2$ gas at the initial stage of film formation until the film achieves a layer thickness of 15 to 30% of the stated layer thickness prevents the Cu film surface layer portion from being oxidized, so that the reflectance can be at a higher value. However, unless the O$_2$ gas is added after the film has been formed beyond 30%, though there is no problem with reflectance, film lifting may occur. Accordingly, the formation of the $Al_2O_3$ film without the addition of any $O_2$ gas may be conducted only at the initial stage of film formation during which the film reaches a layer thickness of 15 to 30% of the stated layer thickness. Also, the amount of $O_2$ gas added when the $Al_2O_3$ film is deposited, i.e., the total pressure of a reaction space that is substantially determined by the $O_2$ gas fed into the chamber, may be within the range of $6.65 \times 10^{-3}$ Pa to $26.6 \times 10^{-3}$ Pa, taking into account any occurrence of film separation. The $Al_2O_3$ film can be formed even without the addition of $O_2$ gas when the $Al_2O_3$ film is formed. This is because oxygen atoms are contained in materials other than the $)_2$ gas and such materials are used in film formation.

The protective layer (second protective layer) 5 is an $SiO_2$ film, which may have a layer thickness from 10 nm to 20 nm. If it has a layer thickness smaller than 10 nm, it may provide a low surface strength. If it has a layer thickness greater than 20 nm, the mirror may have insufficient optical characteristics such as reflecting properties.

Conditions for forming the respective films in Example 1 are shown in Table 1.

EXAMPLE 2

In Example 2, on the metallic polygonal mirror substrate 1 made of an aluminum alloy (Al—Mg type), an intermediate layer 2, a metallic reflective layer 3, a protective layer (first protective layer) 4 and a protective layer (second protective layer) 5 were formed in order. The intermediate layer 2, the metallic reflective layer 3, the protective layer (first protective layer) 4 and the protective layer (second protective layer) 5 were formed in the same manner as in Example 1, except that the metallic reflective layer 3 was formed by employing a deposition material heating system making use of electron beams.

Conditions for forming the respective films in Example 2 are shown in Table 2.

As can be seen from Tables 1 and 2, Examples 1 and 2 differ in the deposition material heating system for forming the metallic reflective layer. In Example 1, W (tungsten) boat resistance heating is used, but in Example 2 electron beams are used.

EXAMPLE 3

In Example 3, as shown in FIG. 2, on a metallic polygonal mirror substrate 1 made of an aluminum alloy (Al—Mg type), an intermediate layer 2, a metallic reflective layer 3, a protective layer (first protective layer) 4, a protective layer (second protective layer) 5 and a protective layer (third protective layer) 6 were formed in order. In Example 3, differently from Examples 1 and 2, a third protective layer is provided on the second protective layer. Also, in Example 3, the metallic reflective layer 3 was formed by employing W boat resistance heating as the deposition material heating system in the same manner as in Example 1. The intermediate layer 2, the metallic reflective layer 3 and the protective layer (first protective layer) 4 were also formed in the same manner. Accordingly, the details regarding these layers are omitted.

The protective layer (second protective layer) 5 is comprised of a $TiO_2$ film, and may have a layer thickness from 80 nm to 100 nm. If its layer thickness is less than 80 nm or greater than 100 nm, the mirror may have insufficient optical characteristics such as reflecting properties inclusive of incident-angle dependence.

The protective layer (third protective layer) 6 is an $SiO_2$ film, which may have a layer thickness from 10 nm to 20 nm. If its layer thickness is less than 10 nm, it may provide low surface strength. If its thickness is greater than 20 nm, the mirror may have insufficient optical characteristics such as reflecting properties.

Conditions for forming the respective films in Example 3 are shown in Table 3.

EXAMPLE 4

In Example 2, on the metallic polygonal mirror substrate 1 made of an aluminum alloy (Al—Mg type), an intermediate layer 2, a metallic reflective layer 3, a protective layer (first protective layer) 4, a protective layer (second protective layer) 5 and a protective layer (third protective layer) 6 were formed in order. The intermediate layer 2, the metallic reflective layer 3, the protective layer (first protective layer) 4, the protective layer (second protective layer) 5 and the protective layer (third protective layer) 6 were formed in the same manner as in Example 3, except that the metallic reflective layer 3 was formed by employing a deposition material heating system making use of electron beams.

Conditions for forming the respective films in Example 4 are shown in Table 4.

As can be seen from the accompanying Tables 3 and 4, Examples 3 and 4 differ in the deposition material heating system for forming the metallic reflective layer. In Example 3, W (tungsten) boat resistance heating is used, but in Example 4 electron beams are used.

With regard to the above Examples 1 to 4:

a) summarized in Table 5 is the relationship between i) the amount of $O_2$ gas added during deposition of the intermediate layer $TiO_2$, in other words, the total pressure of reaction space when the $O_2$ is added; ii) reflectance before and after a durability test (left standing under the conditions shown in the table); and iii) adhesion of the Cu film to the $TiO_2$ film;

b) in Table 6, the relationship between i) degree of vacuum during deposition of the metallic reflective layer Cu film; and ii) reflectance before and after the durability test;

c) in Table 7, the relationship between i) layer thickness by which the $O_2$ gas is not added at the initial stage of deposition of the protective layer $Al_2O_3$ film; ii) reflectance before and after the durability test; and iii) adhesion of the $Al_2O_3$ film to the Cu film; and d) in Table 8, the relationship between i) the amount of $O_2$ gas added during deposition of the protective layer $Al_2O_3$ film; in other words, the total pressure of reaction space when the $O_2$ is added; and ii) adhesion of the $Al_2O_3$ film to the Cu film.

In these tables, as to "A" and "C" shown as evaluation results in the item "adhesion", "A" is a symbol indicating that film separation does not occur, and "C", film separation occurs. p Also summarized in Table 9 are the results of the evaluation of a corrosion percentage after durability test, reflectance, film lifting percentage, adhesion, and wiping resistance.

As can be seen from Table 5, the film separation is seen to have occurred when the amount of $O_2$ gas added during deposition of the intermediate layer $TiO_2$, in other words, the total pressure of reaction space when the $O_2$ is added, is below $6.65 \times 10^{-3}$ Pa ($0.5 \times 10^{31\ 4}$ Torr in Table 5). As also can be seen from Table 6, when the degree of vacuum during deposition of the Cu film is below $3.32 \times 10^{-3}$ Pa ($2.5 \times 10^{-5}$ Torr), the reflectance is lower than 95% in some cases depending on wavelength. As can also be seen in Table 7, film separation occurred when the layer thickness formed while the $O_2$ gas is not added from the beginning of deposition of the protective layer $Al_2O_3$ film is larger than 30% of the stated layer thickness (e.g., a layer thickness of 38%). As further can be seen in Table 8, the film separation occurred when the amount of ) $O_2$ gas added during deposition of the protective layer $Al_2O_3$ film, in other words, the total pressure of reaction space, is outside the range of $6.65 \times 10^{-3}$ Pa to $26.6 \times 10^{-3}$ Pa. As can still further be seen in Table 9, both the adhesion and the wiping resistance are good in Examples 1 to 4.

To test the adhesion, a pressure-sensitive adhesive tape (available from Nichiban Co., Ltd.) was brought into a close adhesion with the surface of the metallic rotary polygonal mirror, and then peeled therefrom at a rate of 20 mm/sec to visually examine whether or not the surface also peeled.

To test the wiping resistance, a sheet of lens cleaning paper (Dusper was used) was impregnated with a solvent (50 vol. % of ether+50 vol. % of methanol). This cleaning paper was pressed against the metallic rotary polygonal mirror at a pressure of 2 kg/cm$^2$, and moved back and forth ten times, and thereafter, visual examination was made to determine whether or not any scratches could be seen on the surface. In Table 9, "A" indicates that the surface was not scratched even after the wiping resistance test.

Comparative Test

As shown in Tables 10 and 11, films of various materials Cr, Ni, Ti, Ni—Cr (Cr: 20 wt. %), $Cr_2O_3$ (with $O_2$), $Cr_2O_3$ (without $O_2$), $ZrO_2$ (with $O_2$), $Al_2O_3$ (without $O_2$), $SiO_2$ (with $O_2$), $Ta_2O_5$ (without $O_2$) and $TiO_2$ (with $O_2$) were each formed by vacuum deposition in a layer thickness of 80 nm to 120 nm. "With $O_2$" shows that the film was deposited in an atmosphere with the addition of $O_2$ at an $O_2$ partial pressure of $1.99 \times 10^{-3}$ Pa.

On each film thus formed, a thin Cu film was superposed in a thickness of about 100 nm, and on the thin Cu film an $Al_2O_3$ film was further formed in a thickness of 170 nm. Then, as the outermost surface layer, an $SiO_2$ film was formed in a thickness of 14 nm. The $Al_2O_3$ and $SiO_2$ films were formed at an $O_2$ partial pressure of $1.99 \times 10^{-3}$ Pa.

Metallic rotary polygonal mirrors thus obtained were left standing in an atmosphere of 70° C., 85% RH and $O_3$ concentration of 1 ppm for 100 hours to examine their environmental properties. Layer configuration: Al/intermediate layer/Cu/$AL_2O_3$/$SiO_2$.

With regard to "Corrosion" in Table 10, even slight changes in appearance of the mirror surface before and after the durability test were counted as the number of occurrence.

As the result, as shown in Tables 10 and 11, the following is seen.

(1) The adhesion of the metallic reflective layer to the substrate material satisfies the standard, except for the sample having no intermediate layer.

(2) With regard to the corrosion, when examined by the method in which even slight changes in appearance of mirror surface before and after the durability test are counted as the number of occurrence, corrosion percentages are 10% or less in three types, Ni—Cr (Cr: 20 wt. %), $Cr_2O_3$, (with $O_2$) and $TiO_2$ (with $O_2$) .

(3) When the reflectance at an incident angle 15° of S polarized light with wavelength of 655 nm, 675 nm and 780 nm each is examined before and after the durability test, almost all samples having the intermediate layers except for the $TiO_2$ film do not satisfy the standard of 95% or higher.

(4) With regard to the phenomenon of film lifting, oxide type intermediate layer materials are more effective for preventing the phenomenon from occurring than metal type layers.

Figure 4:
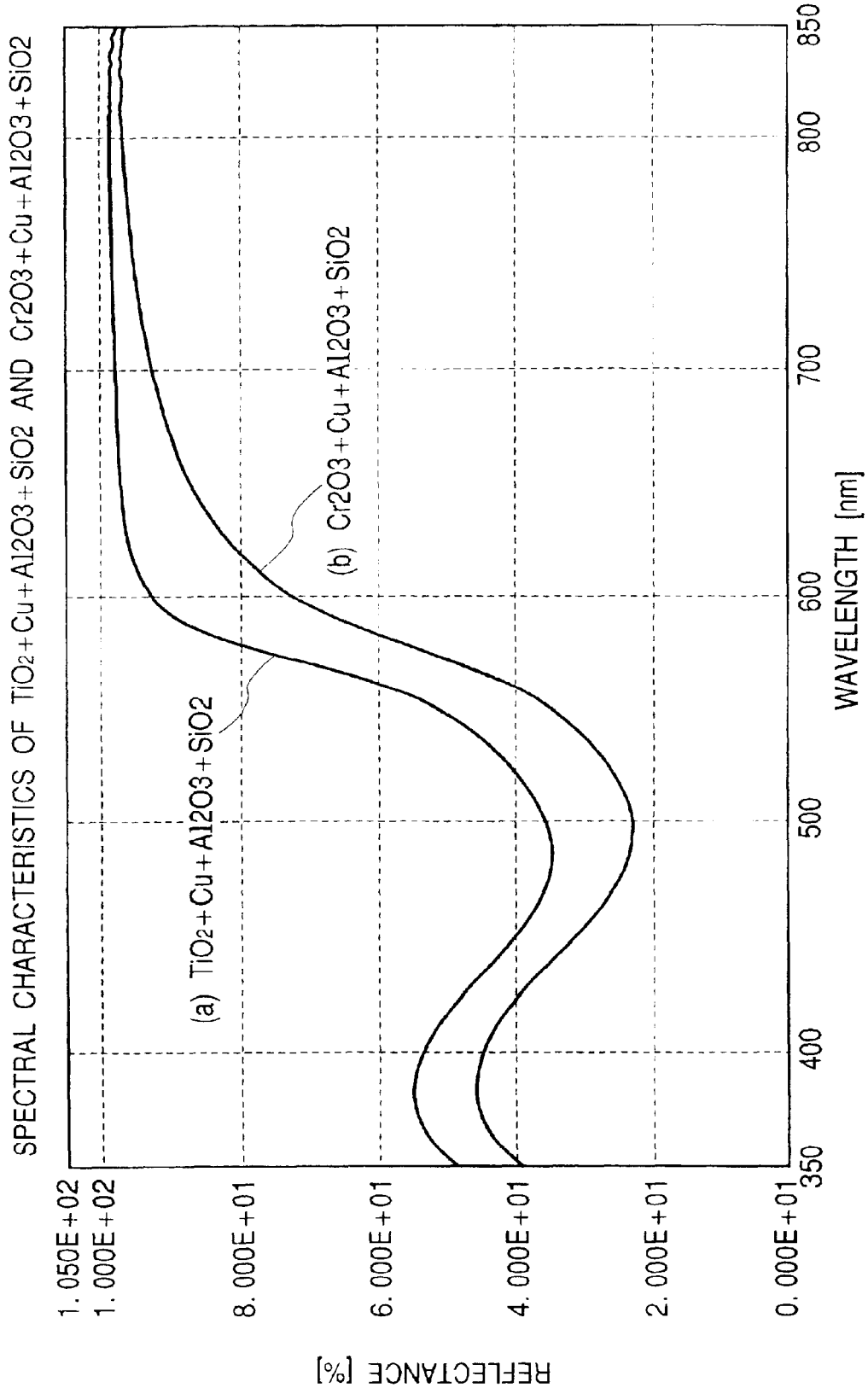
FIG. 4 is a graph showing spectral characteristics of reflectance when $TiO_2$ or $Cr_2O_3$ is used as an intermediate-layer material.

With regard to $Cr_2O_3$ (with $O_2$), which showed good results in the above corrosion test, the reflectance is not sufficient from the initial stage. FIG. 4 shows spectral characteristics of reflectance with respect to $TiO_2$ or $Cr_2O_3$. As shown therein, the $Cr_2O_3$ results in an insufficient reflectance. With regard to Ni—Cr (Cr: 20 wt. %) which showed good results in the above corrosion test, there is a little problem associated with the phenomenon of film lifting, and further there is another problem that the film formation speed is so low that it is not suitable for production.

Figure 5:
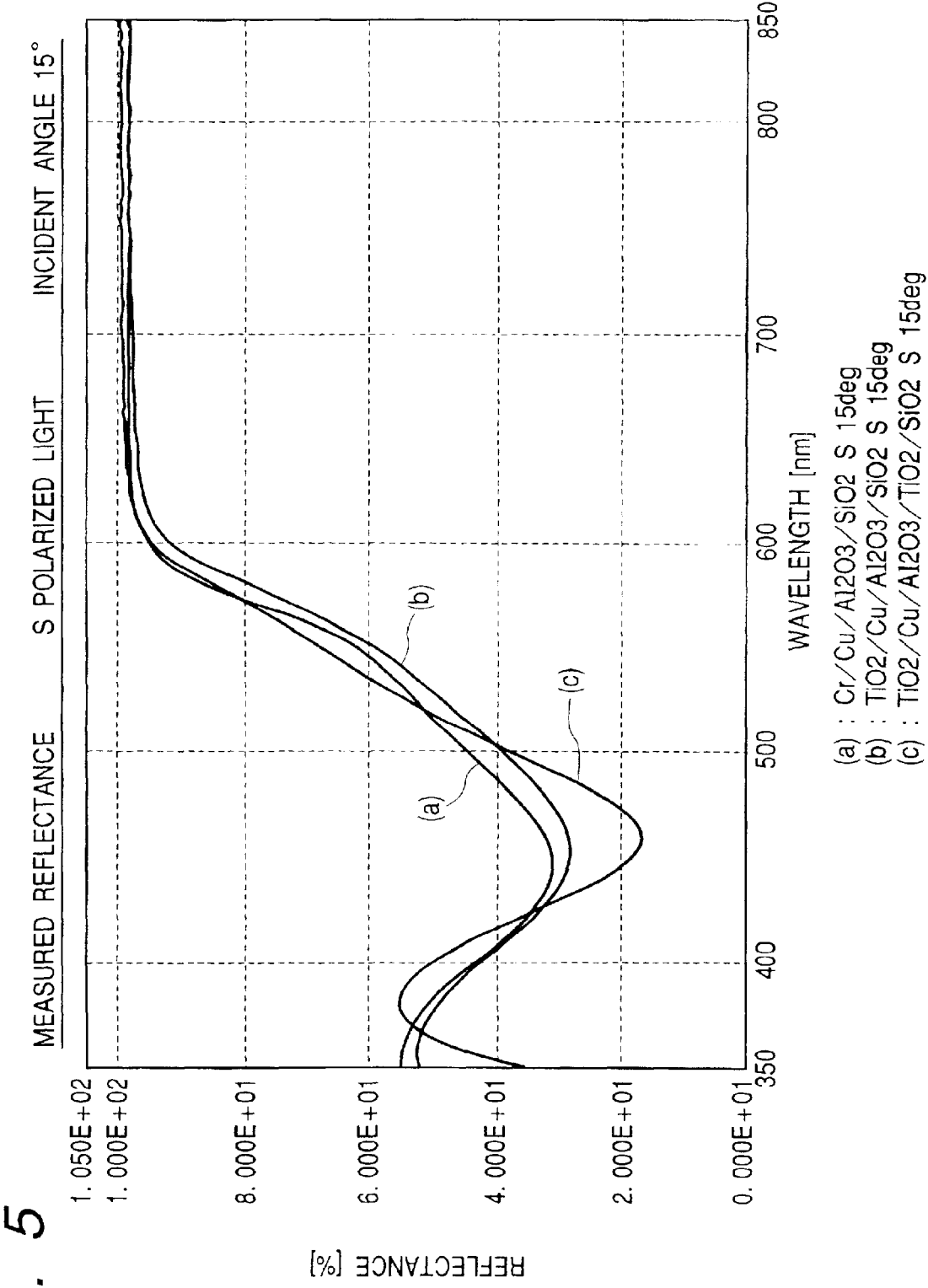
FIG. 5 is a graph making a comparison between spectral characteristics of reflectance in S polarized light at an incident angle of 15° when a $TiO_2$ film is used as the intermediate layer and spectral characteristics of reflectance in S polarized light at incident angle of 15° when conventional Cr is used.
Figure 6:
FIG. 6 is an optical-microscope photograph showing corrosion of an intermediate layer in a conventional case.
Figure 7:
FIG. 7 is an optical-microscope photograph showing corrosion of an intermediate layer in a conventional case.
Figure 8:
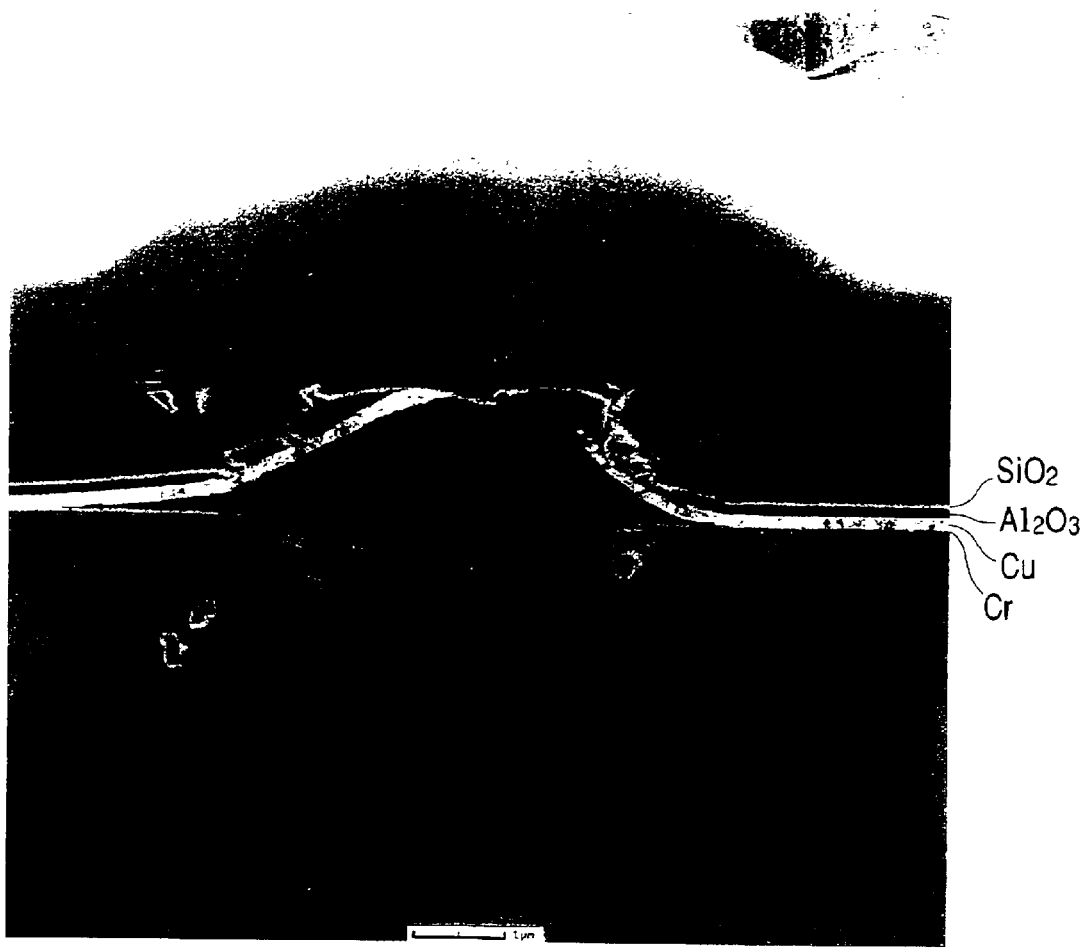
FIG. 8 is an FIB cross-sectional photograph of a corroded portion.
Figure 9:
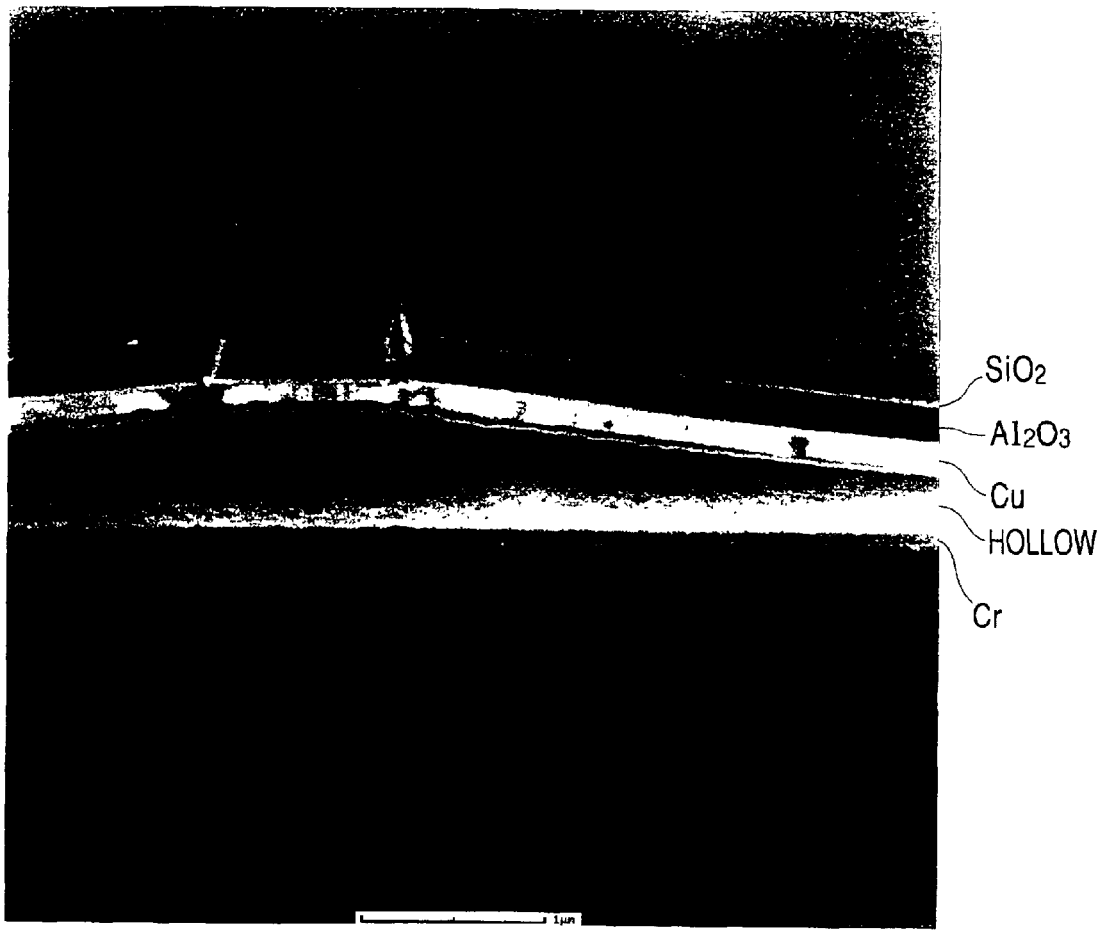
FIG. 9 is an FIB cross-sectional photograph of a phenomenon of film lifting.
Figure 10:
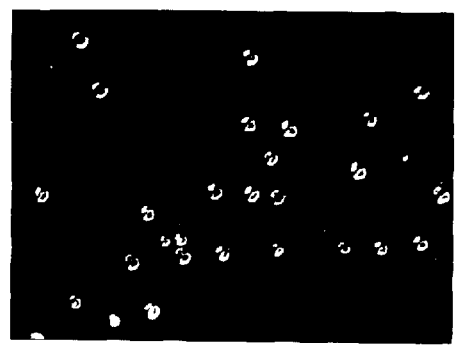
FIG. 10 is a surface optical-microscope photograph of the phenomenon of film lifting.
Figure 11:
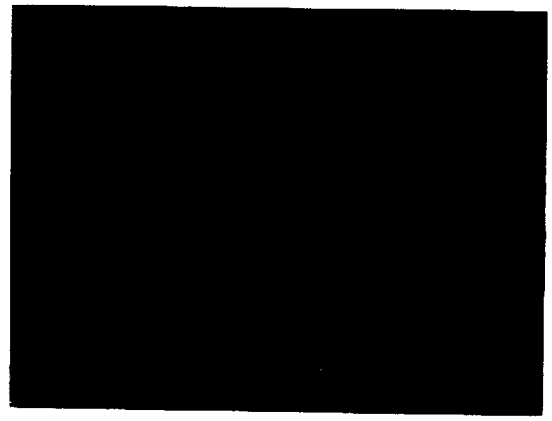
FIG. 11 is a surface optical-microscope photograph of the phenomenon of film lifting.
Figure 12:
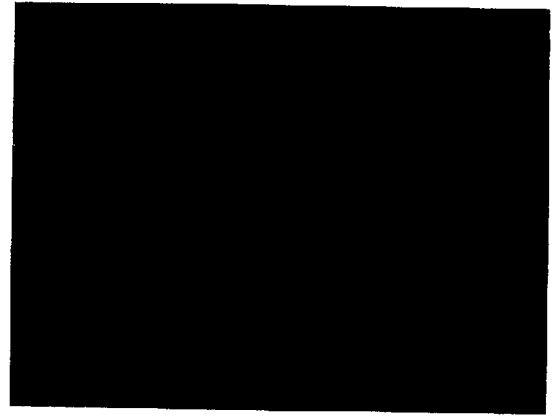
FIG. 12 is a surface optical-microscope photograph of the phenomenon of film lifting.

In FIG. 5, spectral characteristics of reflectance in S polarized light at an incident angle of 15° are compared between when the $TiO_2$ film is used as the intermediate layer and when the conventional Cr is used As can be seen therefrom, a reflectance comparable to or higher than conventional cases is obtainable also when the $TiO_2$ film is used as the intermediate layer.

Figure 13:
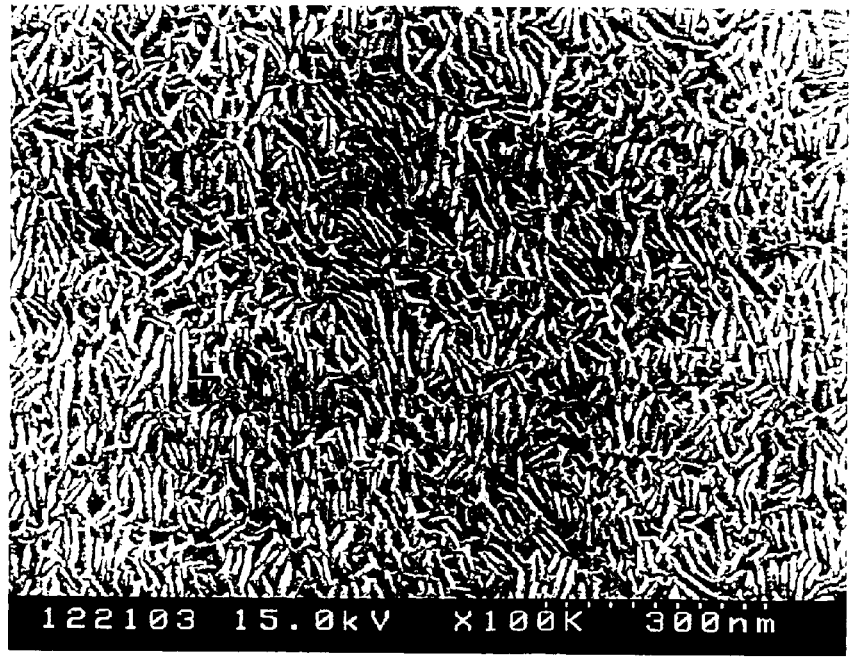
FIG. 13 is an SEM (scanning electron microscope) photograph of a Cr film surface.
Figure 14:
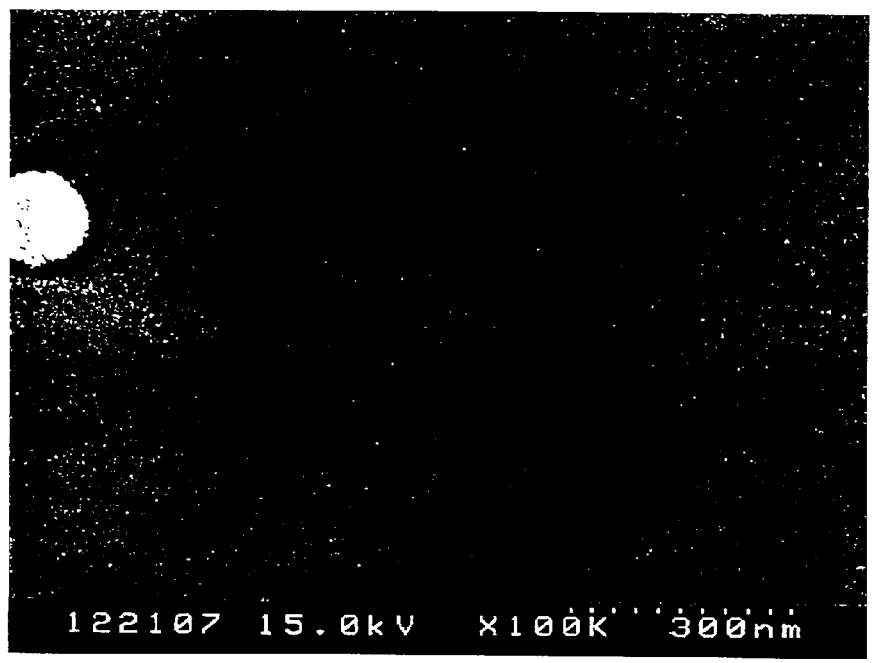
FIG. 14 is an SEM (scanning electron microscope) photograph of a $TiO_2$ film surface.

To make sure that the $TiO_2$ film is superior as the intermediate layer, the state of the film surface of each of the $TiO_2$ thin films and the Cr thin films was observed on an FESEM (field emission scanning electron microscope). The film surface of the Cr thin film, as shown in FIG. 13, has a columnar texture, and is supposed to allow $H_2$ and $O_2$ to pass, whereas, as shown in FIG. 14, the $TiO_2$ thin film structure and is presumed to be able to prevent $H_2O$ and $O_2$ from entering.

TABLE 1

| Layers | Deposition material heating | Substrate temperature (° C.) | Degree of vacuum (Torr) | Deposition rate (mm/sec) |
|---|---|---|---|---|
| Intermediate layer 2: | Electron beams | 150 | $1.5 \times 10^{-4}$ $O_2$ added | 0.2 |
| Metallic reflecting layer 3: | W boat resistance heating | 150 | $1.0 \times 10^{-5}$ | 2.0 |
| Protective layer 4: | Electron beams | 150 | $1.5 \times 10^{-4}$ $O_2$ added* | 0.2 |
| Protective layer 5: | Electron beams | 150 | $1.5 \times 10^{-4}$ $O_2$ added | 0.2 |

*But without addition of $O_2$ at the initial stage of film formation until the film came to have a layer thickness of 15 to 30% of the stated layer thickness.

TABLE 2

| Layers | Deposition material heating | Substrate temperature (° C.) | Degree of vacuum (Torr) | Deposition rate (mm/sec) |
|---|---|---|---|---|
| Intermediate layer 2: | Electron beams | 150 | $1.5 \times 10^{-4}$ $O_2$ added | 0.2 |
| Metallic reflecting layer 3: | Electron beams | 150 | $1.0 \times 10^{-5}$ | 2.0 |
| Protective layer 4: | Electron beams | 150 | $1.5 \times 10^{-4}$ $O_2$ added* | 0.2 |
| Protective layer 5: | Electron beams | 150 | $1.5 \times 10^{-4}$ $O_2$ added | 0.2 |

*But without addition of $O_2$ at the initial stage of film formation until the film came to have a layer thickness of 15 to 30% of the stated layer thickness.

TABLE 3

| Layers | Deposition material heating | Substrate temperature (° C.) | Degree of vacuum (Torr) | Deposition rate (mm/sec) |
|---|---|---|---|---|
| Intermediate layer 2: | Electron beams | 150 | $1.5 \times 10^{-4}$ $O_2$ added | 0.2 |
| Metallic reflecting layer 3: | W boat resistance heating | 150 | $1.0 \times 10^{-5}$ | 2.0 |
| Protective layer 4: | Electron beams | 150 | $1.5 \times 10^{-4}$ $O_2$ added* | 0.2 |
| Protective layer 5: | Electron beams | 150 | $1.5 \times 10^{-4}$ $O_2$ added | 0.2 |
| Protective layer 6: | Electron beams | 150 | $1.5 \times 10^{-4}$ $O_2$ added | 0.2 |

TABLE 4

| Layers | Deposition material heating | Substrate temperature (° C.) | Degree of vacuum (Torr) | Deposition rate (mm/sec) |
|---|---|---|---|---|
| Intermediate layer 2: | Electron beams | 150 | $1.5 \times 10^{-4}$ $O_2$ added | 0.2 |
| Metallic reflecting layer 3: | Electron beams | 150 | $1.0 \times 10^{-5}$ | 2.0 |
| Protective layer 4: | Electron beams | 150 | $1.5 \times 10^{-4}$ $O_2$ added* | 0.2 |
| Protective layer 5: | Electron beams | 150 | $1.5 \times 10^{-4}$ $O_2$ added | 0.2 |
| Protective layer 6: | Electron beams | 150 | $1.5 \times 10^{-4}$ $O_2$ added | 0.2 |

(In Tables 3 & 4) *But without addition of $O_2$ at the initial stage of film formation until the film came to have a layer thickness of 15 to 30% of the stated layer thickness.

TABLE 5

| Amount of $O_2$ gas added during deposition of intermediate layer $TiO_2$ ($\times 10^{-4}$ Torr) | | Reflectance (S polarized light) | | | | | | |
|---|---|---|---|---|---|---|---|---|
| | | Before durability test | | | After durability test | | | |
| | | 655 nm (%) | 675 nm (%) | 780 nm (%) | 655 nm (%) | 675 nm (%) | 780 nm (%) | Adhesion |
| 0.0 | Example 1: | 96.2 | 96.3 | 97.2 | 96.1 | 96.3 | 97.2 | C |
| | Example 2: | 95.3 | 95.9 | 96.9 | 95.2 | 95.8 | 96.8 | C |
| | Example 3: | 97.2 | 97.6 | 98.0 | 97.0 | 97.2 | 97.6 | C |
| | Example 4: | 97.1 | 97.7 | 98.0 | 96.9 | 97.4 | 97.8 | C |
| 0.3 | Example 1: | 96.3 | 96.7 | 97.5 | 96.1 | 96.5 | 97.3 | C |
| | Example 2: | 95.5 | 96.0 | 97.0 | 95.3 | 96.0 | 96.9 | C |
| | Example 3: | 97.2 | 97.5 | 98.1 | 97.0 | 97.4 | 97.8 | C |
| | Example 4: | 97.4 | 97.9 | 98.4 | 97.1 | 97.8 | 98.2 | C |
| 0.5 | Example 1: | 96.4 | 96.7 | 97.5 | 96.2 | 96.5 | 97.4 | A |
| | Example 2: | 95.4 | 96.0 | 97.1 | 95.2 | 95.8 | 97.0 | A |
| | Example 3: | 97.3 | 97.7 | 98.4 | 97.1 | 97.6 | 98.3 | A |
| | Example 4: | 97.4 | 98.0 | 98.5 | 97.2 | 97.8 | 98.3 | A |
| 1.0 | Example 1: | 96.6 | 96.7 | 97.6 | 96.5 | 96.7 | 97.7 | A |
| | Example 2: | 95.6 | 96.1 | 97.2 | 95.4 | 96.0 | 97.1 | A |
| | Example 3: | 97.4 | 97.8 | 98.5 | 97.2 | 97.6 | 98.3 | A |
| | Example 4: | 97.5 | 98.0 | 98.7 | 97.3 | 97.8 | 98.7 | A |
| 1.2 | Example 1: | 96.3 | 96.8 | 97.6 | 96.1 | 96.7 | 97.4 | A |
| | Example 2: | 95.5 | 96.0 | 97.0 | 95.3 | 96.3 | 97.7 | A |
| | Example 3: | 97.5 | 97.9 | 98.5 | 97.4 | 97.8 | 98.4 | A |
| | Example 4: | 97.6 | 98.0 | 98.7 | 97.4 | 97.9 | 98.6 | A |
| 1.5 | Example 1: | 96.1 | 96.3 | 97.2 | 96.0 | 96.3 | 97.2 | A |
| | Example 2: | 95.5 | 96.1 | 97.1 | 95.4 | 96.3 | 97.7 | A |
| | Example 3: | 97.5 | 97.8 | 98.6 | 97.3 | 97.8 | 98.5 | A |
| | Example 4: | 97.7 | 98.2 | 98.8 | 97.5 | 98.1 | 98.7 | A |
| 2.0 | Example 1: | 95.5 | 96.0 | 97.0 | 95.3 | 95.7 | 96.7 | A |
| | Example 2: | 95.4 | 95.8 | 96.8 | 95.2 | 95.60 | 96.6 | A |
| | Example 3: | 95.9 | 97.6 | 98.4 | 95.7 | 97.4 | 98.2 | A |
| | Example 4: | 96.74 | 97.9 | 98.2 | 96.5 | 97.7 | 98.0 | A |

TABLE 5-continued

| Amount of $O_2$ gas added during deposition of intermediate layer $TiO_2$ (×10⁻⁴ Torr) | | Reflectance (S polarized light) | | | | | | |
|---|---|---|---|---|---|---|---|---|
| | | Before durability test | | | After durability test | | | |
| | | 655 nm (%) | 675 nm (%) | 780 nm (%) | 655 nm (%) | 675 nm (%) | 780 nm (%) | Adhesion |
| 2.5 | Example 1: | 94.4 | 95.3 | 96.7 | 93.9 | 94.9 | 95.8 | A |
| | Example 2: | 94.2 | 95.2 | 96.4 | 93.7 | 94.6 | 95.9 | A |
| | Example 3: | 95.0 | 96.8 | 97.5 | 94.8 | 96.1 | 96.9 | A |
| | Example 4: | 95.0 | 96.7 | 97.4 | 94.7 | 96.4 | 96.9 | A |

Degree of vacuum before deposition of Cu: $1.0 \times 10^{-5}$ Torr.
$O_2$ gas ($1.5 \times 10^{-4}$ Torr) added throughout deposition of $Al_2O_3$.
Durability test conditions: 70° C., 85% RH, ozone 1 ppm, 100 hrs.

TABLE 6

| Degree of vacuum during deposition of Cu (×10⁻⁵ Torr) | | Reflectance (S polarized light) | | | | | |
|---|---|---|---|---|---|---|---|
| | | Before durability test | | | After durability test | | |
| | | 655 nm (%) | 675 nm (%) | 780 nm (%) | 655 nm (%) | 675 nm (%) | 780 nm (%) |
| 0.5 | Example 1: | 96.4 | 96.6 | 97.5 | 96.3 | 96.5 | 97.4 |
| | Example 2: | 95.9 | 96.2 | 97.1 | 95.8 | 96.1 | 97.0 |
| | Example 3: | 97.6 | 98.2 | 98.6 | 97.5 | 98.1 | 98.5 |
| | Example 4: | 97.6 | 98.0 | 98.8 | 97.3 | 97.9 | 98.5 |
| 0.8 | Example 1: | 96.3 | 96.5 | 97.5 | 96.2 | 96.4 | 97.4 |
| | Example 2: | 95.9 | 96.3 | 97.2 | 95.8 | 96.2 | 97.1 |
| | Example 3: | 97.5 | 98.1 | 98.7 | 97.4 | 98.0 | 98.6 |
| | Example 4: | 97.7 | 98.1 | 98.8 | 97.5 | 98.0 | 98.6 |
| 1.0 | Example 1: | 96.1 | 96.3 | 97.2 | 96.0 | 96.3 | 97.2 |
| | Example 2: | 95.5 | 96.1 | 97.1 | 95.4 | 96.3 | 97.7 |
| | Example 3: | 97.5 | 98.0 | 98.6 | 97.3 | 97.8 | 98.5 |
| | Example 4: | 97.7 | 98.2 | 98.8 | 97.5 | 98.1 | 98.7 |
| 1.5 | Example 1: | 96.0 | 96.2 | 97.0 | 95.8 | 96.0 | 96.9 |
| | Example 2: | 95.5 | 96.0 | 97.2 | 95.4 | 96.2 | 97.1 |
| | Example 3: | 97.4 | 98.0 | 98.5 | 97.3 | 97.9 | 98.4 |
| | Example 4: | 97.6 | 98.2 | 98.7 | 97.5 | 98.0 | 98.5 |
| 2.0 | Example 1: | 95.8 | 96.0 | 96.8 | 95.7 | 96.0 | 96.6 |
| | Example 2: | 95.3 | 95.9 | 97.0 | 95.2 | 95.7 | 96.8 |
| | Example 3: | 97.2 | 97.9 | 98.3 | 97.0 | 97.7 | 98.1 |
| | Example 4: | 97.3 | 98.0 | 98.6 | 97.0 | 97.8 | 98.3 |
| 2.5 | Example 1: | 95.2 | 95.9 | 96.5 | 94.8 | 95.6 | 96.4 |
| | Example 2: | 95.0 | 95.8 | 96.8 | 94.8 | 95.5 | 96.6 |
| | Example 3: | 95.7 | 96.6 | 97.5 | 94.9 | 95.9 | 97.2 |
| | Example 4: | 95.7 | 96.7 | 97.6 | 94.9 | 95.8 | 97.3 |
| 3.0 | Example 1: | 94.9 | 95.7 | 96.0 | 94.4 | 95.4 | 95.7 |
| | Example 2: | 94.7 | 95.5 | 96.5 | 94.2 | 95.2 | 95.8 |
| | Example 3: | 95.4 | 96.5 | 96.9 | 94.9 | 96.2 | 96.5 |
| | Example 4: | 95.5 | 96.4 | 97.5 | 94.8 | 95.9 | 96.8 |

$O_2$ gas ($1.5 \times 10^{-4}$ Torr) added during deposition of $TiO_2$.
$O_2$ gas ($1.5 \times 10^{-4}$ Torr) added throughout deposition of $Al_2O_3$.
Durability test conditions: 70° C., 85% RH, ozone 1 ppm, 100 hrs.

TABLE 7

| Layer thickness by which no O₂ gas was added after start of Al₂O₃ deposition | | Reflectance (S polarized light) | | | | | | Adhesion |
|---|---|---|---|---|---|---|---|---|
| | | Before durability test | | | After durability test | | | |
| | | 655 nm (%) | 675 nm (%) | 780 nm (%) | 655 nm (%) | 675 nm (%) | 780 nm (%) | |
| O₂ gas added throughout deposition | Example 1: | 96.1 | 96.3 | 97.2 | 96.0 | 96.3 | 97.2 | A |
| | Example 2: | 95.5 | 96.1 | 97.1 | 95.4 | 96.3 | 97.7 | A |
| | Example 3: | 97.5 | 98.0 | 98.6 | 97.3 | 97.8 | 98.5 | A |
| | Example 4: | 97.7 | 98.2 | 98.8 | 97.5 | 98.1 | 98.7 | A |
| 8% of the stated layer thickness | Example 1: | 96.0 | 96.3 | 97.2 | 96.0 | 96.2 | 97.1 | A |
| | Example 2: | 95.5 | 96.1 | 97.1 | 95.3 | 96.0 | 97.0 | A |
| | Example 3: | 97.5 | 98.0 | 98.5 | 97.4 | 97.8 | 98.4 | A |
| | Example 4: | 97.7 | 98.2 | 98.8 | 97.5 | 98.1 | 98.7 | A |
| 15% of the stated layer thickness | Example 1: | 96.5 | 96.7 | 97.7 | 96.4 | 96.7 | 97.7 | A |
| | Example 2: | 95.8 | 96.4 | 97.4 | 95.7 | 96.3 | 97.3 | A |
| | Example 3: | 97.8 | 98.2 | 98.6 | 97.7 | 98.2 | 98.5 | A |
| | Example 4: | 97.8 | 98.4 | 98.8 | 97.7 | 98.3 | 98.7 | A |
| 23% of the stated layer thickness | Example 1: | 96.6 | 96.7 | 97.7 | 96.4 | 96.5 | 97.6 | A |
| | Example 2: | 95.9 | 96.5 | 97.5 | 95.8 | 96.4 | 97.4 | A |
| | Example 3: | 97.9 | 98.2 | 98.7 | 97.8 | 98.1 | 98.6 | A |
| | Example 4: | 97.8 | 98.4 | 98.9 | 97.7 | 98.3 | 98.7 | A |
| 30% of the stated layer thickness | Example 1: | 96.6 | 96.8 | 97.8 | 96.5 | 96.4 | 97.7 | A |
| | Example 2: | 95.9 | 96.4 | 97.4 | 95.7 | 96.3 | 97.4 | A |
| | Example 3: | 97.8 | 98.2 | 98.6 | 97.7 | 98.1 | 98.5 | A |
| | Example 4: | 97.9 | 98.5 | 98.9 | 97.8 | 98.4 | 98.8 | A |
| 38% of the stated layer thickness | Example 1: | 96.3 | 96.6 | 97.5 | 96.2 | 96.4 | 97.4 | C |
| | Example 2: | 95.6 | 96.2 | 97.0 | 95.4 | 96.0 | 96.9 | C |
| | Example 3: | 97.6 | 98.0 | 98.4 | 97.5 | 97.9 | 98.3 | C |
| | Example 4: | 97.7 | 98.1 | 98.7 | 97.6 | 98.0 | 98.5 | C |
| 46% of the stated layer thickness | Example 1: | 96.3 | 96.5 | 97.5 | 96.2 | 96.4 | 97.4 | C |
| | Example 2: | 95.6 | 96.1 | 97.0 | 95.5 | 96.0 | 96.9 | C |
| | Example 3: | 97.5 | 98.0 | 98.5 | 97.4 | 97.9 | 98.4 | C |
| | Example 4: | 97.6 | 98.0 | 98.7 | 97.5 | 97.9 | 98.6 | C |
| 54% of the stated layer thickness | Example 1: | 96.2 | 96.4 | 97.2 | 96.0 | 96.2 | 97.0 | C |
| | Example 2: | 95.5 | 96.0 | 96.9 | 95.4 | 96.0 | 96.9 | C |
| | Example 3: | 97.4 | 97.9 | 98.5 | 97.3 | 97.8 | 98.4 | C |
| | Example 4: | 97.5 | 97.9 | 98.6 | 97.4 | 97.8 | 98.5 | C |
| 62% of the stated layer thickness | Example 1: | 96.1 | 96.3 | 97.1 | 96.0 | 96.2 | 97.1 | C |
| | Example 2: | 95.4 | 95.9 | 96.8 | 95.2 | 95.6 | 96.5 | C |
| | Example 3: | 97.3 | 97.7 | 98.4 | 97.1 | 97.5 | 98.2 | C |
| | Example 4: | 97.4 | 97.8 | 98.5 | 97.3 | 97.7 | 98.4 | C |

O₂ gas (1.5 × 10⁻⁴ Torr) added during deposition of TiO₂.
Degree of vacuum before deposition of Cu: 1.0 × 10⁻⁵ Torr.
Pressure for addition of O₂ gas during deposition of Al₂O₃: 1.5 × 10⁻⁴ Torr.
Durability test conditions: 70° C., 85% RH, ozone 1 ppm, 100 hrs.

TABLE 8

| Amount of O₂ gas added during deposition of Al₂O₃ (×10⁻⁴ Torr) | | Adhesion |
|---|---|---|
| 0.0 | Example 1: | C |
| | Example 2: | C |
| | Example 3: | C |
| | Example 4: | C |
| 0.3 | Example 1: | C |
| | Example 2: | C |
| | Example 3: | C |
| | Example 4: | C |
| 0.5 | Example 1: | A |
| | Example 2: | A |
| | Example 3: | A |
| | Example 4: | A |
| 1.0 | Example 1: | A |
| | Example 2: | A |
| | Example 3: | A |
| | Example 4: | A |
| 1.2 | Example 1: | A |
| | Example 2: | A |
| | Example 3: | A |
| | Example 4: | A |
| 1.5 | Example 1: | A |
| | Example 2: | A |
| | Example 3: | A |
| | Example 4: | A |
| 2.0 | Example 1: | A |
| | Example 2: | A |
| | Example 3: | A |
| | Example 4: | A |
| 2.2 | Example 1: | C |
| | Example 2: | C |
| | Example 3: | C |
| | Example 4: | C |
| 2.5 | Example 1: | C |
| | Example 2: | C |
| | Example 3: | C |
| | Example 4: | C |

O₂ gas (1.5 × 10⁻⁴ Torr) added during deposition of TiO₂.
Degree of vacuum before deposition of Cu: 1.0 × 10⁻⁵ Torr.
O₂ gas (1.5 × 10⁻⁴ Torr) added throughout deposition of Al₂O₃.

TABLE 9

| | Corrosion percentage (%) | Film lifting percentage (%) | Reflectance (S polarized light) | | | | | | Adhesion | Wiping resistance |
|---|---|---|---|---|---|---|---|---|---|---|
| | | | Before durability test | | | After durability test | | | | |
| Example: | | | 655 nm (%) | 675 nm (%) | 780 nm (%) | 655 nm (%) | 675 nm (%) | 780 nm (%) | | |
| 1 | 5.2 | 0.0 | 96.1 | 96.3 | 97.2 | 96.0 | 96.3 | 97.2 | A | A |
| 2 | 3.3 | 0.0 | 95.5 | 96.1 | 97.1 | 95.4 | 96.3 | 97.7 | A | A |
| 3 | 3.7 | 0.0 | 97.5 | 98.0 | 98.6 | 97.3 | 97.8 | 98.5 | A | A |
| 4 | 4.0 | 0.0 | 97.7 | 98.2 | 98.8 | 97.5 | 98.1 | 98.7 | A | A |

Durability test conditions: 70° C., 85% RH, ozone 1 ppm, 100 hrs.

TABLE 10

| Intermediate layer material | Corrosion | | Reflectance (S polarized light) | | | | | | Adhesion |
|---|---|---|---|---|---|---|---|---|---|
| | Number of occurrence/ number of exam. | Percent-age (%) | Before durability test | | | After durability test | | | |
| | | | 655 nm (%) | 675 nm (%) | 780 nm (%) | 655 nm (%) | 675 nm (%) | 780 nm (%) | |
| Cr | 125/190 | 65.8 | 96.5 | 96.5 | 97.2 | 97.0 | 97.1 | 97.0 | A |
| None | 13/20 | 65.0 | 94.7 | 95.6 | 96.7 | 93.0 | 94.3 | 96.6 | C |
| Ni | 12/20 | 60.0 | 88.4 | 90.9 | 95.4 | 84.3 | 87.3 | 92.7 | A |
| Ti | 10/20 | 50.0 | 95.4 | 95.7 | 96.7 | 93.2 | 94.2 | 96.5 | A |
| Ni—Cr (20) | 2/20 | 10.0 | 96.2 | 96.5 | 97.2 | 96.3 | 96.5 | 97.1 | A |
| $Cr_2O_3$ (with $O_2$) | 3/60 | 5.0 | 85.8 | 89.1 | 94.5 | 82.2 | 86.6 | 93.7 | A |
| $Cr_2O_3$ (without $O_2$) | 12/60 | 20.0 | 94.6 | 95.9 | 96.8 | 94.3 | 95.4 | 96.9 | A |
| $ZrO_2$ (with $O_2$) | 7/60 | 11.7 | 91.1 | 94.0 | 96.3 | 90.4 | 92.7 | 96.7 | A |
| $Al_2O_3$ (without $O_2$) | 4/20 | 20.0 | 94.7 | 95.6 | 96.6 | 94.0 | 94.7 | 96.8 | A |
| $SiO_2$ (with $O_2$) | 7/20 | 35.0 | 91.7 | 93.3 | 96.0 | 91.0 | 93.0 | 96.4 | A |
| $Ta_2O_5$ (with $O_2$) | 8/20 | 40.0 | 94.3 | 95.5 | 97.0 | 95.3 | 96.5 | 97.0 | A |
| $Ta_2O_5$ (without $O_2$) | 11/60 | 18.3 | 94.5 | 95.7 | 96.9 | 95.3 | 96.1 | 97.0 | A |
| $TiO_2$ (with $O_2$) | 6/180 | 3.3 | 95.5 | 96.1 | 97.1 | 95.4 | 96.3 | 97.7 | A |

TABLE 11

| Intermediate layer material | Phenomenon of film lifting | | Writing resistance test |
|---|---|---|---|
| | Number of occurrence/ number of examination | Percentage (%) | |
| Cr | 45/190 | 23.7 | A |
| None | 9/20 | 45.0 | A |
| Ni | 8/20 | 40.0 | A |
| Ti | 7/20 | 35.0 | A |
| Ni—Cr (20) | 6/20 | 30.0 | A |
| $Cr_2O_3$ (with $O_2$) | 0/60 | 0.0 | A |
| $Cr_2O_3$ (without $O_2$) | 0/60 | 0.0 | A |
| $ZrO_2$ (with $O_2$) | 3/60 | 5.0 | A |
| $Al_2O_3$ (without $O_2$) | 1/20 | 5.0 | A |
| $SiO_2$ (with $O_2$) | 2/10 | 10.0 | A |
| $Ta_2O_5$ (with $O_2$) | 0/20 | 0.0 | A |
| $Ta_2O_5$ (without $O_2$) | 2/60 | 3.3 | A |
| $TiO_2$ (with $O_2$) | 0/180 | 0.0 | A |

What is claimed is:

1. A metallic rotary polygonal mirror comprising:
a metallic polygonal mirror substrate made of aluminum or an aluminum alloy;
an intermediate layer of $TiO_2$ formed by vacuum deposition on the substrate;
a metallic reflective layer of Cu formed by vacuum deposition on the intermediate layer; and
a protective layer including at least a layer of $Al_2O_3$, formed by vacuum deposition on the metallic reflective layer,
wherein said protective layer comprises a double layer consisting of a first protective layer and a second protective layer,
wherein said first protective layer is a layer of $Al_2O_3$, and said second protective layer is a layer of $SiO_2$, and
wherein said first protective layer has a layer thickness of from 150 nm to 200 nm, and said second protective layer has a layer thickness of from 10 nm to 20 nm.

* * * * *

UNITED STATES PATENT AND TRADEMARK OFFICE
CERTIFICATE OF CORRECTION

PATENT NO. : 6,916,101 B2
DATED : July 12, 2005
INVENTOR(S) : Michio Yanagi et al.

It is certified that error appears in the above-identified patent and that said Letters Patent is hereby corrected as shown below:

Title page,
Item [56], References Cited, FOREIGN PATENT DOCUMENTS,
"JP    62-26768    *2/1986" should read
-- JP    61-26768    *2/1986 --.
Item [57], ABSTRACT,
Line 4, "in layer." should read -- Cu layer. --.

Column 3,
Line 24, "do" should read -- does --; and
Line 63, "$TiO_2$ or $Cr_2O_3$" should read -- $TiO_2$ [curved line (a)] or $Cr_2O_3$ [curved line (b)] --.

Column 4,
Line 1, "layer" should read -- layer [curved line (b): double-layer protective layer; curved line (c): triple-layer protective layer] --;
Line 3, "used." should read -- used [curved line (a)]. --; and
Line 40, "can not" should read -- cannot --.

Column 6,
Line 27, "it has a" should read -- its --; and
Line 48, "in" should read -- with --.

Column 7,
Line 13, "$)_2$ gas" should read -- $O_2$ gas --.

Column 8,
Line 55, "p Also" should read -- ¶ Also --; and
Line 63, "($0.5 \times 10^{31}$ $^4$Torr" should read -- ($0.5 \times 10^{-4}$ Torr --.

Column 9,
Line 6, "of) $O_2$ gas" should read -- of $O_2$ gas --.

Column 10,
Line 26, "$TiO_2$ or $Cr_2O_3$" should read -- $TiO_2$ [curved line (a)] or $Cr_2O_3$ [curved line (b)]. --;
Line 27, ". As" should read -- As --;
Line 37, "layer" should read -- layer [curved line (b): double-layer protective layer; curved line (c): triple-layer protective layer] --;
Line 38, "used" should read -- used [curved line (a)]. -- and
Line 48, "film" should read -- film has a dense film --.

UNITED STATES PATENT AND TRADEMARK OFFICE
CERTIFICATE OF CORRECTION

PATENT NO. : 6,916,101 B2
DATED : July 12, 2005
INVENTOR(S) : Michio Yanagi et al.

It is certified that error appears in the above-identified patent and that said Letters Patent is hereby corrected as shown below:

Column 11,
Table 5, "2.0    Example 1:  95.5   96.0   97.0   95.3   95.7    96.7  A
                 Example 2:  95.4   95.8   96.8   95.2   95.60   96.6  A
                 Example 3:  95.9   97.6   98.4   95.7   97.4    98.2  A
                 Example 4:  96.74  97.9   98.2   96.5   97.7    98.0  A"
should read
         -- 2.0  Example 1:  95.5   96.0   97.0   95.3   95.7    96.7  A
                 Example 2:  95.4   95.8   96.8   95.2   95.6    96.6  A
                 Example 3:  95.9   97.6   98.4   95.7   97.4    98.2  A
                 Example 4:  96.7   97.9   98.2   96.5   97.7    98.0  A --.

Column 17,
Table 11, "Writing Resistance Test" should read -- Wiping Resistance Test --.

Signed and Sealed this

Twenty-eighth Day of February, 2006

JON W. DUDAS
*Director of the United States Patent and Trademark Office*

UNITED STATES PATENT AND TRADEMARK OFFICE
CERTIFICATE OF CORRECTION

PATENT NO.     : 6,916,101 B2
DATED          : July 12, 2005
INVENTOR(S)    : Michio Yanagi et al.

It is certified that error appears in the above-identified patent and that said Letters Patent is hereby corrected as shown below:

<u>Title page,</u>
Item [73], Assignee, "Canon Kabushiki Kaisha, Tokyo (JP)" should read -- Canon Denshi Kabushiki Kaisha, Chichibu-shi (JP) --.

Signed and Sealed this

Sixth Day of June, 2006

JON W. DUDAS
*Director of the United States Patent and Trademark Office*